Figure 1:
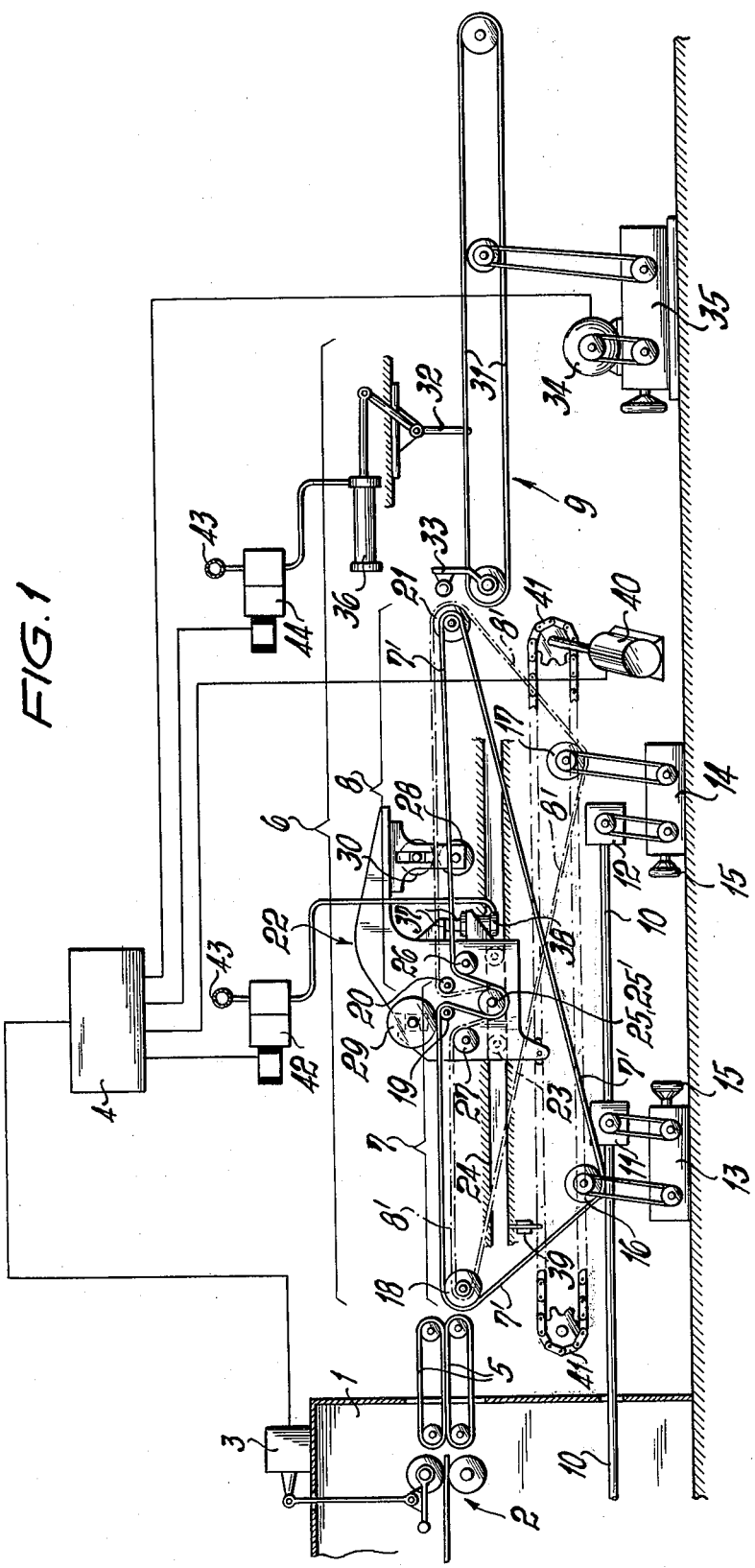

United States Patent [19]
Feldkamper

[11] 3,911,800
[45] Oct. 14, 1975

[54] APPARATUS FOR FORMING LOOSE PACKETS CONTAINING A PREDETERMINED NUMBER OF FLAT WORK PIECES

[75] Inventor: Richard Feldkamper, Lengerich of Westphalia, Germany

[73] Assignee: Windmoller & Holscher, Lengerich of Westphalia, Germany

[22] Filed: Mar. 5, 1974

[21] Appl. No.: 448,198

[30] Foreign Application Priority Data
Mar. 8, 1973  Germany............................ 2311541

[52] U.S. Cl.............. 93/93 HT; 93/93 DP; 271/182; 271/202
[51] Int. Cl.²......................................... B31B 1/98
[58] Field of Search............ 93/93 HT, 93 DP, 93 R, 93/93 C, 8 R; 271/182, 202, 203, 256, 258, 270; 198/34, 35

[56] References Cited
UNITED STATES PATENTS

| | | | |
|---|---|---|---|
| 2,852,990 | 9/1958 | Roe.................................... | 93/93 DP |
| 2,919,789 | 1/1960 | Coakley.............................. | 93/93 R |
| 3,224,758 | 12/1965 | Siempelkamp....................... | 271/64 |
| 3,683,758 | 8/1972 | Feldkamper....................... | 93/93 DP |
| 3,724,840 | 4/1973 | Kuckhermann............... | 93/93 DP X |
| 3,768,382 | 10/1973 | Zernov et al...................... | 93/93 DP |

*Primary Examiner*—Granville Y. Custer, Jr.
*Assistant Examiner*—James F. Coan
*Attorney, Agent, or Firm*—Fleit & Jacobson

[57] ABSTRACT

In apparatus for forming loose packets containing a predetermined number of superposed flat workpieces from a row of said workpieces delivered by a supply conveyor, a second conveyor moving slower than the supply conveyor receives the workpieces in an overlapping formation and delivers them to a third conveyor which leads them to a packeting station. The third conveyor moves faster than the second conveyor. Brake means near the downstream end of the second conveyor are operative temporarily to build up and interrupt the flow of overlapping workpieces and are displaceable in the downstream direction at the same speed as the feeding speed of the second conveyor, the conveying run of the second conveyor being extensible in the downstream direction at the same speed as its feeding speed.

13 Claims, 4 Drawing Figures

APPARATUS FOR FORMING LOOSE PACKETS CONTAINING A PREDETERMINED NUMBER OF FLAT WORK PIECES

The invention relates to an apparatus for forming loose packets containing a predetermined number of superposed flat workpieces from a row of said workpieces delivered by a supply conveyor.

The invention is particularly applicable to the packeting of tubular sections of paper or plastics material used in the manufacture of bags or sacks. An apparatus for packeting paper bag sections is described in German Pat. Specification No. 2,003,553 and comprises a first or supply conveyor for transporting the workpieces in a row, a slower second conveyor downstream of the supply conveyor for bringing the row of workpieces to an overlapping formation, brake means disposed near the downstream end of the second conveyor and operative, after said predetermined number of workpieces has been supplied, so as temporarily to build up and interrupt the flow of overlapping workpieces, a third conveyor downstream of the second conveyor and movable faster than same, and a single packeting station downstream of the third conveyor, the packeting station comprising an abutment extending transversely to the direction in which the workpieces are fed from the third conveyor.

In the manufacture of paper bags, a tube-forming machine makes endless flattened tubular paper webs which are then severed into sections and discharged so that the bag sections are fed lengthwise. The bag sections are subsequently supplied in packets to a base-forming machine in which they are fed transversely to their lengths. For this purpose it is necessary to form clean stacks of bag sections which are accurately aligned at their edges because the base-forming machine cannot operate properly if the bag sections in each stack are misaligned. Since a tube-forming machine generally operates twice as fast as a base-forming machine and could therefore supply two such base-forming machines with bag sections, the accurate stacks or packets of bag sections must be formed very rapidly. The aforementioned packeting apparatus would not be able to do this for the following reasons. Whilst a finished packet is being taken from the packeting station, the flow of overlapping workpieces on the second conveyor must be built up until the packeting station has been completely vacated. However, removal of the packets cannot be effected too rapidly for fear of upsetting the edgewise alignment of the workpieces in each stack under the action of excessive acceleration. This is particularly so because longitudinal misalignment of the workpieces in each stack will create problems in accurately feeding the workpieces transversely into the base-forming machine. Movement of a completed stack of workpieces out of the packeting or stacking station therefore generally takes place more slowly and one must allow at least about four to five seconds until the packeting station has been vacated. During this period the overlapping arrangement of workpieces on the second conveyor must be built up. At a rate of 250 to 300 workpieces per minute, or 4 to 5 workpieces per second, from 16 to 25 workpieces will need to be accumulated on the second conveyor but this is just about the number of bag sections that might be required in a small stack. As a consequence, in a case where small numbers of workpieces are contained in each stack, the stacking or packeting operation would take place on the second conveyor rather than at the packeting station. Such accumulation of workpieces on the second conveyor will not, however, result in the formation of an accurately-aligned stack and the misalignment caused on the second conveyor can only be partially rectified at the packeting station because, once the workpieces have been piled on one another in a haphazard manner, it is more difficult to slide them relatively to one another and push them into alignment. In any case, when pushing one workpiece into alignment it is likely than an overlying or underlying workpiece will be pushed out of alignment. Loose superpositioning of the workpieces is a prerequisite for forming a tidy packet from the overlapping arrangement on the second conveyor. If the time for clearing the packeting station is reduced in order to decrease the number of overlapping workpieces on the second conveyor, a well aligned stack will be upset again as it is accelerated out of the packeting station. If the time for clearing a stack out of the packeting station is increased, the formation of a well aligned packet is made more difficult by reason of what has taken place further upstream of the apparatus when the workpieces were still in an overlapping formation.

German Pat. Specification No. 1,586,350 suggests that the row of workpieces coming from the first conveyor might be alternatively deflected to an upper and a lower belt conveyor on which the workpieces are placed in respective overlapping formations and which each lead to a packeting station. Such an apparatus possessing two packeting stations is a vast improvement and enables accurately-aligned stacks of workpieces to be obtained because there will be sufficient time for clearing each packeting station without causing a build-up of workpieces on the upper and lower belt conveyors. However, the apparatus with two packeting stations and two conveyors on which the workpieces are in an overlapping formation is relatively expensive because of the additional equipment that is required. In addition, such apparatus is not particularly suitable for use in conjunction with a tube-forming machine having a high output rate. This is because such a tube-forming machine delivers workpieces at very short time intervals and hence there is very little time available for operating a deflector. In a case of a tube-forming machine delivering 300 workpieces per minute at a spacing equal to 5 percent of the pitch of the workpieces, the time it takes for a workpiece to pass a particular point, for example the tip of a deflector, is only 10 milliseconds. It is not only difficult to ensure that the deflector is operated within the short time but also to control the deflector so that its operation in fact coincides within this short time interval.

The invention aims to provide a packeting apparatus which can form well aligned packets of workpieces but is not as expensive as an apparatus using two packeting stations.

According to the invention, an apparatus for forming loose packets containing a predetermined number of superposed flat workpieces from a row of said workpieces delivered by a supply conveyor comprises a slower second conveyor downstream of the supply conveyor for bringing the row of workpieces to an overlapping formation, brake means disposed near the downstream end of the second conveyor and operative, after said predetermined number of workpieces has been supplied, so as temporarily to build up and interrupt the flow of overlapping workpieces, a third conveyor downstream of the second conveyor and movable faster than same, and a packeting station downstream of the third conveyor, the packeting station comprising an abutment extending transversely to the direction in which the workpieces are fed from the third conveyor, wherein, during said build-up of overlapping workpieces on the second conveyor, the brake means are displaceable in the downstream direction at the same speed as the feeding speed of the second conveyor, and the conveying run of the second conveyor is extensible in the downstream direction at the same speed as its feeding speed.

By means of the invention, the overlapping formation of workpieces on the second conveyor is advanced depending on the supply of workpieces at the upstream end; the overlapping formation is extended in a downstream direction as the supply of workpieces might demand. Although, therefore, there will be an accumulation of workpieces for a certain period whilst they are in an overlapping formation and there will be an interruption in the supply of workpieces to the third conveyor to enable the packeting station to be cleared, the workpieces on the second conveyor are not pushed into a denser arrangement, i.e., the degree of overlap of the workpieces will not be increased. The loose arrangement of workpieces in the overlapping formation is therefore maintained so that they can be easily transferred to the third conveyor and accurately stacked. The formation of each packet of workpieces therefore continues to take place at the packeting station rather than on the second conveyor and, even with a large number of workpieces in each stack, the supply of workpieces to the packeting station can be interrupted for as long as is necessary to enable each stack or packet to be removed from the packeting station.

The packeting and packet-clearing operations with an apparatus according to the present invention would therefore take place as follows. During packeting at the packeting station, the conveying run of the second conveyor is quite short and the braking means are well upstream in a position of readiness. A short overlapping formation of workpieces is formed on the short conveying run of the second conveyor. The workpieces are taken by the third conveyor at a faster speed than they are being fed on the second conveyor and supplied to the packeting station where they are accurately stacked. When a predetermined number of workpieces has passed between the second and third conveyors, the flow of workpieces to the third conveyor can be interrupted, thereby preparing for subsequent clearing of the packet from the packeting station. This interruption of flow is effected by actuating the brake means and advancing them in the downstream direction at the same speed as that of the second conveyor and simultaneously extending the conveying run of the second conveyor. The workpieces continuing to come from the first conveyor are therefore deposited on the ever-increasing length of the conveying run of the second conveyor in the same overlapping formation as previously but no additional workpiece is allowed to pass to the third conveyor. Any workpieces still remaining on the third conveyor are delivered to the packeting station. After a certain time during which the finished packet can settle, it can be removed from the packeting station at a speed which is low enough to ensure that the alignment of the workpieces is not upset. In the meantime, the conveying run of the second conveyor and the overlapping workpieces thereon have extended to a certain length. After the packeting station has been cleared, the braking means are released and the conveying run of the second conveyor will become shorter again. At the same time, the braking means return to their position of readiness. By reason of return movement of the conveying run of the second conveyor simultaneously with circulation of the second conveyor, workpieces will now be delivered by the second conveyor to the third conveyor at a faster rate than new workpieces are being supplied by the first conveyor. The third conveyor must, so to speak, work off the accumulation of workpieces that took place on the second conveyor during clearing of the packeting station and therefore receive the workpieces at a higher rate and discharge them to the packeting station at a higher rate. Since the third conveyor moves faster than the second conveyor, it is readily possible to do this. Retraction of the conveying run of the second conveyor, i.e., its movement in an upstream direction, can influence the time interval between successive workpieces as the accumulation is being worked off. When the conveying run has been reduced to its original short length, the apparatus is ready again to clear a packet from the packeting station.

The conveying runs of the second and third conveyors can be adapted for equal heights if the conveying run of the third conveyor is adjustable in length so that it becomes shorter when the conveying run of the second conveyor is extended, and vice versa. If the conveying runs of the second and third conveyor are bounded at the downstream and upstream ends, respectively, by direction-changing members, these direction changing members may be mounted on a carriage in the form of a slide or trolley that is reciprocatable in a downstream and upstream direction. In order to make it unnecessary for the actual conveying members such as belts to be changed in length when the conveying run of the second conveyor is being extended or retracted, the second and third conveyors may each comprise a plurality of spaced parallel belts, the belts of one of these conveyors being disposed in the gaps between the belts of the other conveyor, wherein the conveyors extend as a whole along approximately the same path and are led in a U-shaped or S-shaped loop by a multiple arrangement of direction-changing members mounted on the carriage, one run of the second conveyor and a parallel run of the third conveyor extending to and from the said multiple arrangement, and wherein the belts of the third conveyor are below the conveying level in the region of the conveying run of the second conveyor and the belts of the second conveyor are below the conveying level in the region of the conveying run of the third conveyor.

In a particularly simple construction, the brake means may comprise a lower roller constituting the said direction-changing member at the said downstream end of the second conveyor and a pressure roller disposed above the said lower roller and defining a feed gap therewith, the pressure roller being mounted on the carriage for displacement in a vertical direction. Pressure exerted by the pressure roller on the lower roller may be occasioned solely by the weight thereof.

Proper engagement by the third conveyor of the workpieces delivered to it by the second conveyor can be enhanced by including a feed gap which is formed between the third conveyor and a further pressure roller which is displaceable in a vertical direction and disposed on the carriage at a distance downstream of the brake means equal to the length of one workpiece. Again, this further pressure roller may be effective solely under its own weight. To obtain substantial coincidence between the instant of engagement of a workpiece by the feed gap of the third conveyor and the instant of release of the workpiece by the second conveyor, the disposition of the further pressure roller may be adjustable relatively to the position at which the brake means are effective.

In one form of the invention, downstream movement of the carriage is effected by a run of the second conveyor and upstream movement by an energy store, cylinder or the like, means being provided for temporarily locking the said run of the second conveyor to the carriage.

Figure 2:
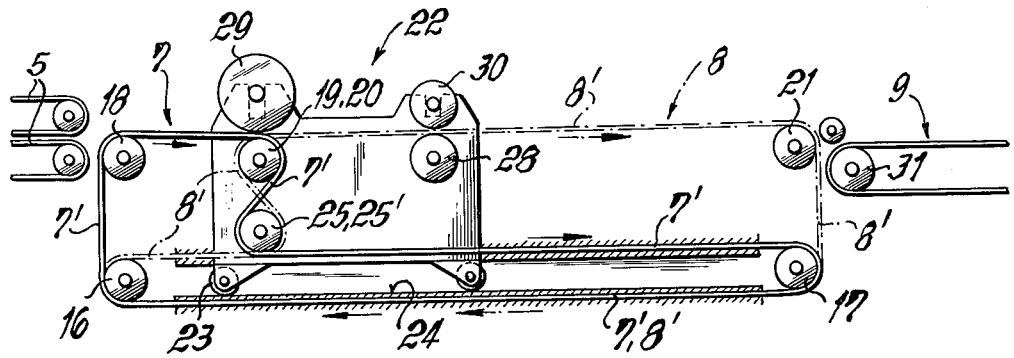
Figure 3:
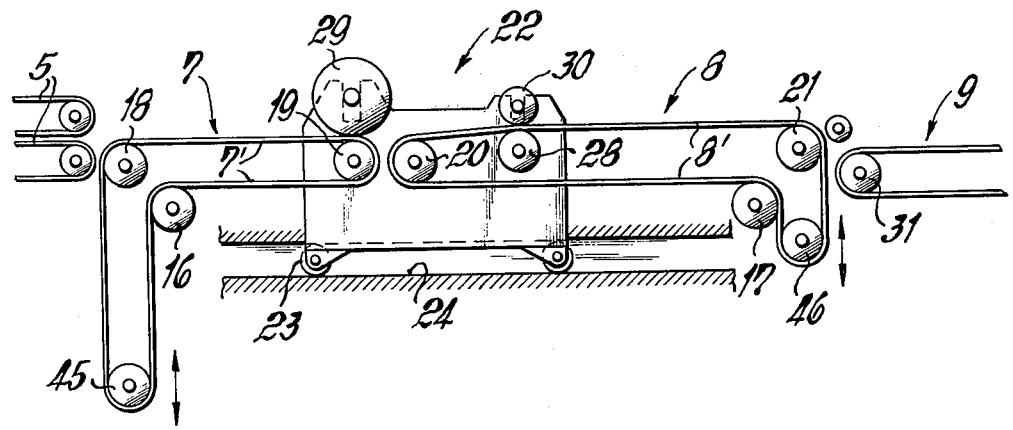
Figure 4:
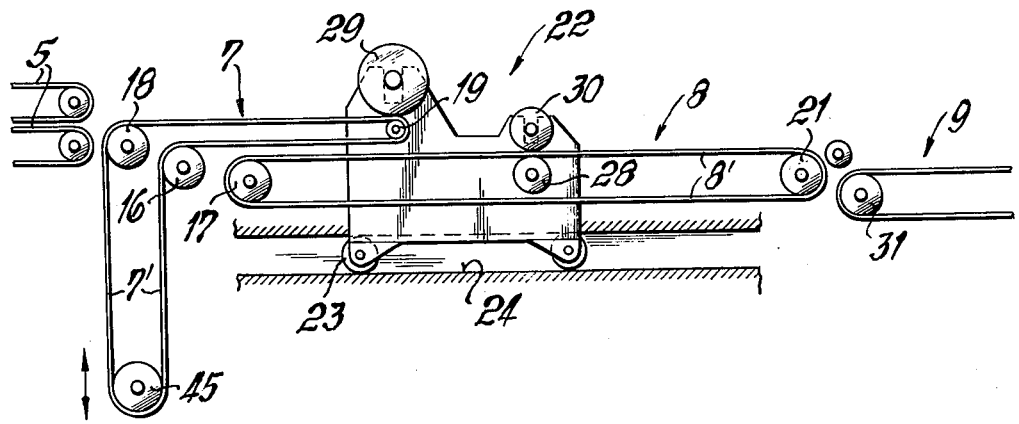

The invention will now be described with reference to the examples illustrated in the accompanying diagrammatic drawings, wherein:

FIG. 1 illustrates a packeting apparatus disposed downstream of a tube-forming machine which delivers flattened tubular bag sections for the purpose of accurate stacking, and FIGS. 2 to 4 show three further examples of packeting equipment.

Referring to FIG. 1, a tube-forming machine is indicated at 1. This comprises a pair 2 of tear-off rolls, the upper roll being vertically reciprocatable and its movement being transmitted to a counter 3. The counter is constructed so that, after a predetermined number of strokes of the upper tear-off roll has set on the counter, an impulse is transmitted to a control device 4. Downstream of the tube-forming machine there is a double belt conveyor 5 which feeds bag sections coming from the tube-forming machine at a slightly higher speed to supply them to the packeting apparatus indicated at 6.

The packeting apparatus 6 comprises two belt conveyors 7 and 8. In FIG. 1, the bracketed lead lines adjacent the reference numerals 7 and 8 actually indicate the conveying runs of these conveyors to show that the conveying run of the conveyor 8 follows directly on the conveying run of the conveyor 7. Each conveyor comprises belts 7' and 8', respectively, which are driven at different speeds proportional to the output rate of the tube-forming machine by means of a shaft 10, which has its drive derived from the tube-forming machine, angle gearing 11 and 12, gearing 13 and 14 each of which is steplessly adjustable by a hand wheel 15, and a drive roller 16 and 17, respectively. The speed levels can be influenced by appropriately selecting the transmission ratios of the angle gearing 11 and 12. The transmission ratios in the case of the conveyor 7 are selected so that the latter is driven at a speed of about 10 to 15 percent of that of the tube-forming machine. The transmission ratios in the drive for the conveyor 8 are selected so that the latter is driven at about 30 percent or one third of the speed of the tube-forming machine but at least about 2.5 to 3 times faster than the conveyor 7. The conveying runs of the conveyors 7 and 8 are bounded by direction-changing elements 18, 19 and 20, 21, respectively. The adjacent direction-changing elements 19 and 20 are mounted on a carriage 22 having wheels 23 that can run in rails 24. The belts 7' and 8' are each led in a U-shaped loop by means of a triple arrangement of direction-changing elements mounted on the carriage, that is to say the elements 19, 25 and 26 in the case of the conveyor 7 and 27, 25', 20 in the case of the conveyor 8. It will be noted that the runs of the two conveyors extend parallel to one another and parallel to the feeding direction where they lead to and from the triple arrangement of direction-changing elements. At the conveyor 7, part of the return run of the conveyor 8 is at a level below the conveying run of the conveyor 7 whereas in the conveyor 8 the conveying run of that conveyor is uppermost. The direction-changing element 19 at the downstream end of the conveyor 7 co-operates with a pressure roll 29 to form a feed gap. The pressure roll 29 lies on the element 19 under its own weight and is mounted in the carriage so that it will yield vertically-upwardly. Similarly, spaced downstream by a distance equal to the length of one bag section and suspended from a supporting arm of the carriage there is a roller 28 which is disposed below the conveying run of the conveyor 8 and serves as a back-up roll for a pressure roller 30. The roller 30 lies on the conveying run of the conveyor 8 under its own weight and forms therewith a feed gap. The distance of this feed gap from the feed gap formed by the members 19, 29 is adjustable.

Downstream of the triple arrangement of direction-changing elements 19, 25, 26 there is a belt locking device 37 comprising two jaws which are attached to the carriage and which can clamp on the belts 7' of the conveyor 7, the upper jaw being stationary and the lower jaw reciprocatable in a vertical direction by means of a self-returning operating cylinder 38. When the device 37 is in clamping engagement with the belts of the conveyor 7, free passage of the belts 7' through the carriage 22 is no longer possible and the carriage is then advanced in a downstream direction at the same speed as the belts 7' under the action of the drive roller 16, the feed gap formed between the members 19, 29 likewise being carried along.

The conveyor 8 transports the bag sections at a faster speed than the conveyor 7 and delivers them to a packeting station 9 which comprises a conveyor 31 that is stationary whilst the bag sections are being stacked. The bag sections are stopped by a transverse abutment 32 and, with the assistance of an oscillating aligning slide 33, are stacked in accurate edgewise alignment on the conveyor 31. The latter can, when required, be set in operation by a motor 34 acting through adjustable gearing 35. The abutment 32 can be swung out of the way of a completed stack by a self-returning operating cylinder 36.

The function of the packeting apparatus is as follows.

During packeting or stacking, the carriage 22 will be located near the upstream end of the conveyor 7 at a position of readiness determined by a stop 39. The carriage has been brought to this position in a manner as hereinafter described by means of a drive comprising a gear motor 40 and chain drive 41. The junction between the conveyors 7 and 8 as defined by the direction-changing elements 19 and 20 is therefore likewise disposed very far to the left as viewed in FIG. 1 and the conveying run of the conveyor 7 will be very short. The bag sections supplied in a row by the conveyor 5 leading from the tube-forming machine 1 are deposited on the slowly-moving short conveyor 7 in an overlapping formation and the feed gap between the members 19, 29 is effective to convey this overlapping formation towards the conveyor 8. The conveyor 8 moves somewhat faster than the conveyor 7 and its feed gap as formed by the pressure roller 30 is effective to engage each leading bag section coming from the feed gap 19, 29, to take it out of the overlapping formation on the conveyor 7 at a higher speed and deliver it to the packeting station 9. On the conveyor 8, the bag sections may still be in an overlapping formation but the degree of overlap between the bag sections is far less than on the conveyor 7. As already mentioned, the aligning slide 33 assists in forming an accurate stack of bag sections on the conveyor 31 upstream of the abutment 32.

In the case of bag sections which have to be fed through a baseforming machine before they are ready to be filled, the precise number of bag sections in each packet or stack is not critical. Consequently, the counter 3 can be disposed at a location where it counts impulses proportional to the number of bag sections torn from a web of bag material by the pair 2 of tear-off rolls. The number of so-called tear-off impulses need not be equal to the number of bag sections that are being deposited on a stack formed on the conveyor 31 because, before reaching the conveyor 31, an occasional faulty bag section may have been removed.

When the counter 3 has counted a set number of bag sections, it transmits an impulse to the control device 4 which is effective to connect the pneumatic cylinder 38 to a pressure source 43 through a valve 42, whereby to operate the clamping device 37 and lock the carriage 22 to the belts 7'. The carriage will now be advanced in a downstream direction at the same speed as the belts 7'. Although the upstream end of the conveyor 7 will continue to be supplied with bag sections from the conveyor 5 at the same speed as before, the degree of overlap of the bag sections on the conveyor 7 will not become more dense because the conveying run of the conveyor 7 is now being effectively extended. It is only the action of the feed gap between the members 19 and 29 that is brought to a halt to serve as braking means ensuring that no further bag section will be delivered to the feed gap of the conveyor 8.

The bag sections still located on the conveyor 8 continue to be deposited at the packeting station 9 and the time for clearing the conveyor 8 is set at the control device 4. Thereafter, the device 4 is effective to connect the operating cylinder 36 to a pressure source 43 via a valve 44 so that the transverse abutment 32 is swung upwardly. The drive 34, 35 for the conveyor 31 is then started and the completed packet or stack of accurately-aligned bag sections is removed. In the meantime, the carriage 22 has been advanced very far to the right in FIG. 1 and a long overlapping formation of bag sections will be disposed on the conveyor 7.

As soon as the packeting station has been cleared, pressure on the cylinder 36 is removed and the latter automatically returns to lower the abutment 32 to the stacking position. Simultaneously therewith, the clamping device 37 of the carriage 22 acting on the belts 7' is released and the drive 40, 41 for return movement of the carriage is switched on by the device 4. Movement of the carriage in the upstream direction should be as slow as possible because, in effect, the time interval between successive bag sections released by the conveyor 7 is superimposed on the conveying speed of the conveyor 7. The faster the upstream movement of the carriage 22, the more quickly will the bag sections reach the feed gap of the conveyor 8 and the greater will be the degree of overlap of the bag sections on the conveyor 8. However, on the conveyor 8 it is desired to have as little overlap as possible so that the leading bag section can be drawn from under the next following bag section without too much difficulty as it reaches the conveyor 31. For this reason, it is advantageous to ensure that the drive for moving the carriage in the upstream direction should be adjustable so that the optimum return speed can be set. With particularly smooth or stiff bag material, a low return speed resulting in little overlap on the conveyor 8 will be acceptable but when there are small numbers of bag sections in each stack to be formed, the carriage should be returned within a short period. For large numbers of bag sections in each stack, a low return speed for the carriage may be used.

The examples illustrated in FIGS. 2 to 4 operate in a manner similar to that described with reference to FIG. 1. FIGS. 2 to 4 therefore make use of the same reference numerals for analogous integers and these integers will not be described again. The tube-forming machine and most of the packeting station has been omitted from FIGS. 2 to 4 for clarity. The following description will concentrate on the conveyors 7 and 8 and the direction-changing elements mounted on the carriage 22. In each of FIGS. 2 to 4 the junction between the conveyors 7 and 8 is displaceable in an upstream and downstream direction, as it was in FIG. 1.

Referring to FIG. 2, the belts 7' of the conveyor 7 are shown in full lines and the belts 8' of the conveyor 8 are shown in chain-dotted lines. A double arrangement of direction-changing elements 19, 20 leads the belts 7' in an S-shaped loop and a double arrangement of direction-changing elements 25, 25' leads the belts 8' in a Z-shaped loop so that the runs of the conveyors extending to and from the direction-changing elements are parallel. The direction-changing rolls 16 and 17 for the conveyors 7 and 8, respectively are the drive rolls because these are enveloped by the respective belts 7' and 8' by approximately 180°. In this embodiment, there is one run of belts which extends over the entire displacement path of the carriage in a downstream direction and another in an upstream direction. Accordingly, downstream movement of the carriage as well as upstream movement can be effected by clamping one run of belts (the run 25 – 16 in a downstream direction and the run 16 – 17 on return movement).

In FIG. 3, the lengths of the conveying runs of the conveyors 7 and 8 are separately variable by means of dancer or jockey rolls 45 and 46, respectively. The conveyors are preferably driven by the direction-changing elements 16 and 17. In this case, each conveyor may consist of a single belt as distinct from a plurality of parallel spaced belts in the previously described embodiments.

In the embodiment of FIG. 4, the conveyor 8 is of fixed length and only the conveying run of the conveyor 7 is variable by means of a jockey roll 45. The roller 16 is driven. The extensible conveying run of the conveyor 7 extends above the conveyor 8 and the resultant difference in elevation between the conveying runs of the two conveyors may be desirable for some applications. During transfer of the overlapping bag sections from one conveyor to the other, the difference in elevation causes the overlapping formation of bag sections to fan open and thereby provide a good opportunity for the bag sections to be counted. If each conveyor comprises a plurality of spaced parallel belts, it is possible to reduce the difference in elevation.

I claim:

1. Apparatus for forming loose packets containing a predetermined number of superposed flat workpieces from a row of said workpieces delivered by a supply conveyor, comprising a slower second conveyor downstream of the supply conveyor for bringing the row of workpieces to an overlapping formation, displaceable brake means disposed near the downstream end of the second conveyor and operative, after said predetermined number of workpieces has been supplied, so as temporarily to build up and interrupt the flow of overlapping workpieces, a reciprocatable carriage means carrying said brake means and comprising locking means for locking said carriage means to said second conveyor so that said carriage means moves with said second conveyor, a conveyor direction changing means establishing the length of said second conveyor, a third conveyor downstream of the second conveyor and movable faster than said second conveyor, and a packeting station downstream of the third conveyor, the packeting station comprising an abutment extending transversely to the direction in which the workpieces are fed from the third conveyor, wherein, during said build-up of overlapping workpieces on the second conveyor, the carriage means having said brake means and said conveyor direction changing means thereon being displaced in the downstream direction at the same speed as the feeding speed of the second conveyor, whereby said brake means is displaced and the conveying run of the second conveyor is extended in the downstream direction at the same speed as the feeding speed of said second conveyor.

2. Apparatus according to claim 1, wherein the conveying run of the third conveyor is adjustable in length so that it becomes shorter when the conveying run of the second conveyor is extended.

3. Apparatus according to claim 1 wherein said reciprocatable carriage means further comprises direction changing means for bounding said third conveyor and is reciprocatable in the downstream and upstream direction.

4. Apparatus according to claim 3, wherein the second and third conveyors each comprise a plurality of spaced parallel belts, the belts of one of these conveyors being disposed in the gaps between the belts of the other conveyor, and wherein the conveyors extend as a whole along approximately the same path and are led in a U-shaped or S-shaped loop by a multiple arrangement of direction-changing members mounted on the carriage, one run of the second conveyor and a parallel run of the third conveyor extending to and from the said multiple arrangement, and wherein the belts of the third conveyor are below the conveying level in the region of the conveying run of the second conveyor and the belts of the second conveyor are below the conveying level in the region of the conveying run of the third conveyor.

5. Apparatus according to claim 4, wherein the brake means comprise a lower roller constituting the said direction-changing member at the said downstream end of the second conveyor and a pressure roller disposed above the said lower roller and defining a feed gap therewith, the pressure roller being mounted on the carriage for displacement in a vertical direction.

6. Apparatus according to claim 5, wherein pressure exerted by the pressure roller on the lower roller is occasioned by the weight thereof.

7. Apparatus according to claim 4 including a feed gap formed between the third conveyor and a pressure roller which is displaceable in a vertical direction and disposed on the carriage at a distance downstream of the brake means equal to the length of one workpiece.

8. Apparatus according to claim 7, wherein the disposition of the pressure roller is adjustable relatively to the position at which the brake means are effective.

9. Apparatus according to claim 8, wherein downstream movement of the carriage is effected by a run of the second conveyor and upstream movement by an energy store, and wherein means are provided for temporarily locking the said run of the second conveyor to the carriage.

10. Apparatus according to claim 8, wherein at least one of the carriage-mounted direction-changing members for the second conveyor can be locked by a brake.

11. Apparatus according to claim 8, wherein at least upstream movement of the carriage is effected by a motor.

12. Apparatus according to claim 11, wherein the motor speed is controllable and wherein upstream carriage movement is at a numerically lower speed than the feeding speed of the second conveyor.

13. Apparatus according to claim 8, comprising at least one conveying run parallel to the feeding direction and one conveying run moving upstream, both said runs extending above the space in which the carriage moves, wherein the carriage is provided with brake means for selectively clamping one of the said runs, whereby reciprocation of the carriage is effected by these runs.

* * * * *